United States Patent [19]

Pillard

[11] 3,885,919

[45] May 27, 1975

[54] RESIDUAL GAS BURNER WITH SUPERIMPOSED, INCREASING SIZE BURNING CHAMBERS

[76] Inventor: Marcel T. Pillard, 6 Avenue Frederic Mistral, Marseille, 13008 France

[22] Filed: Nov. 19, 1973

[21] Appl. No.: 417,144

[30] Foreign Application Priority Data
Nov. 24, 1972 France .............................. 72.42944

[52] U.S. Cl..................... 23/277 C; 23/284; 431/5; 431/10; 431/202; 431/285; 431/174; 261/17; 261/DIG. 9; 110/8 A
[51] Int. Cl............................. F23c 9/04; F23g 7/06
[58] Field of Search ........... 23/277 C, 277 R, 259.5, 23/288 F; 431/5, 10, 202, 351, 352, 353, 431/174, 285; 60/39.32; 110/8 A; 48/223, DIG. 4; 261/17, DIG. 9; 55/DIG. 30

[56] References Cited
UNITED STATES PATENTS

| | | | |
|---|---|---|---|
| 2,010,634 | 8/1935 | Hillhouse ...................... | 23/277 R X |
| 2,889,002 | 6/1959 | Kocee .............................. | 23/277 C |
| 3,098,883 | 7/1963 | Heuse et al. ...................... | 23/277 R |
| 3,567,399 | 3/1971 | Altmann et al. .................. | 23/277 C |
| 3,592,596 | 7/1971 | Henderson...................... | 23/259.5 X |

Primary Examiner—James H. Tayman, Jr.
Attorney, Agent, or Firm—Brooks Haidt Haffner & Delahunty

[57] ABSTRACT

Residual gas burner composed of a smoke-evacuating conduit at the base of which are disposed several superposed combustion chambers coaxial to said conduit, of volume increasing upwardly; each chamber comprises at least one peripheral gas burner and the device comprises means for measuring the total outflow of the residual gases and means for automatically supplying residual gases to a number of burners, counting from the lower burner, varying in the same way than the outflow of gases.

The burner according to the invention is more particularly applicable to burning residual effluents from oil-refineries.

11 Claims, 3 Drawing Figures

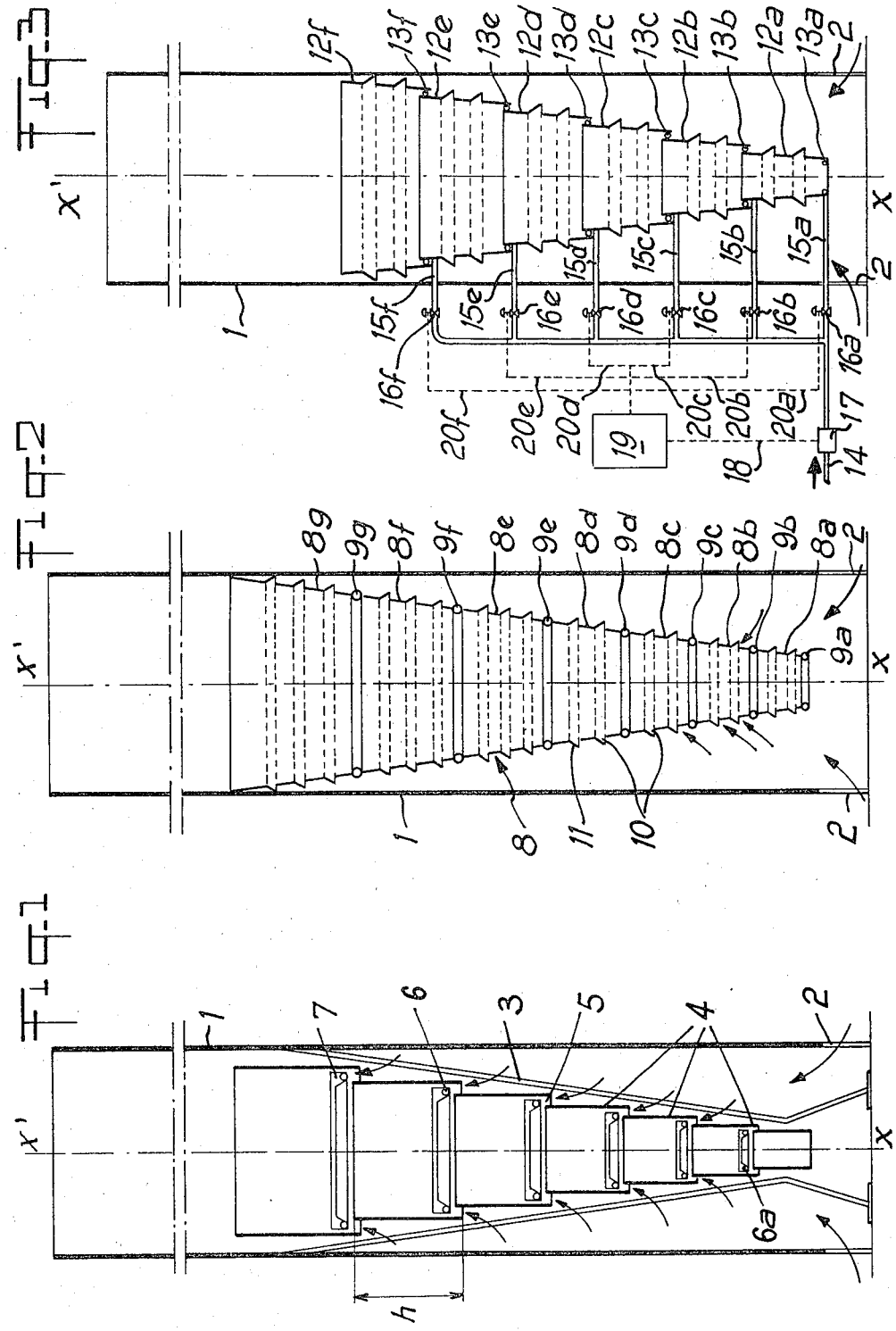

RESIDUAL GAS BURNER WITH SUPERIMPOSED, INCREASING SIZE BURNING CHAMBERS

The present invention relates to processes and apparatus for burning residual gases.

The technical sector concerned by the invention is that of the destruction of combustible gases which constitute effluents from certain industrial plants.

It is known that numerous industrial plants for making chemical products, particularly oil refineries and in the petrochemical industry, produce intermittent, violent evacuations, of considerably varying importance, of residual effluents, constituted by gases more or less charged with liquid particles, the presence of which, in the atmosphere, cannot be tolerated since these effluents generally constitute elements which pollute by their noxiousness, odour and chemical agression.

To eliminate this pollution, the degree of noxiousness of the gaseous effuents must be suppressed, or sufficiently reduced, before these effluents are evacuated to the atmosphere. This purification is effected by the combustion of the effluents, with or without the addition of supplementary fuel, according to whether or not their chemical composition allows their self-combustion.

However, the combustion products thus produced must, in turn, satisfy the requirements of the fight against atmospheric pollution, i.e. must contain a minimum quantity of solid unburnt matter such as particles of carbon or soot and gaseous unburnt matter such as carbon monoxide, sulfuretted hydrogen, hydrocarbons, etc ... and combustion must take place with a much reduced emission of smoke.

These latter conditions are very difficult to fulfill since the quantities of effluents to be eliminated vary very rapidly and in very wide proportions.

To this day, in order to overcome this difficulty and reduce the effects of this secondary pollution by the smoke and the products of combustion of the effulents, these products are generally rejected at a sufficiently high altitude for the residues of combustion to diffuse more widely in the atmosphere.

The combustion of the effluents is most often effected at the top of a very tall surplus-gas flare, of the order of 80 to 90 metres high, where they are made to burn in contact with the ambient air.

The result is a very imperfect combustion. In fact, the sudden variations in flow of the gases, the variations in direction and speed of the wind, the absence of a hot wall and of members for intimately mixing gas and combustion air are factors which lead to a forcibly imperfect combustion.

More recently, so-called "short flares" have been produced in oil refineries, in which the combustion of the effluents is effected by means of a very large number of small burners placed on the bottom or on the walls of a large cylinder which serves as smoke evacuating chimney stack, whose height is limited.

The results of this solution are not at all perfect.

In fact, the stack whose base constitutes the combustion chamber must be of very large diameter, calculated to correspond to the maximum out-flow of effluents.

However, the maximum out-flow of effluents is rarely reached and the combustion, in a chamber of very large volume, of outflows of effluents smaller than half of the maximum outflow leads to incomplete combustions with an abundant emission of smoke.

Furthermore, in these short flares, the gases leave the stack at relatively low maximum speeds, of the order of 3 to 4 metres per second which vary essentially with the outflow of the effluents. This results, at ground level, in a degree of pollution which will never be tolerated for long in view of the increasing severity of the regulations concerning the fight against atmospheric pollution.

One object of the present invention is to attain a good quality of combustion of the gaseous effluents under all conditions, i.e. whatever the variations of the outflow of effluents and the rapidity thereof.

Another object of the present invention is to allow the gaseous effluents to be burned in flare stacks, of average height, whilst obtaining, at the top of the chimney stack, a high vertical output speed of the gases, of the order of 25 to 35 metres per second at the maximum outflow, so that the gases generally reach almost the same altitude as that to which the conventional tall flare stacks take them.

These ends are achieved by means of processes according to which the residual gases are directed towards a plurality of gas burners disposed in vertical, superposed and coaxial combustion chambers, the volume of each chamber being smaller than that of the chamber superposed thereon, the total outflow of residual gases is measured and a number of burners varying in the same way as this outflow is fed with residual gases.

The number of burners fed with residual gases is counted from the bottom, the lower burner being permanently fed or automatically relit as soon as there is an outflow of residual gas. Water vapour mixed with the residual gases and/or with the combustion-supporting air may be injected.

A device according to the invention comprises a conduit for evacuation of the burnt gases having a vertical axis, inside which are disposed, near the base, a plurality of superposed combustion chambers coaxial with said conduit, each chamber having a volume smaller than that of the chamber which is superposed thereon and each chamber comprising at least one gas burner disposed at the periphery of the base, which burner may be fed with residual gases, and at least one inlet for combustion-supporting air permanently fed by natural draft. The burnt gas evacuating conduit is generally cylindrical and the combustion chambers are superposed sections of cylinders or upwardly widening truncated cones, coaxial with said conduit. These sections define annular spaces between themselves, in which are placed the burners constituted by perforated pipes in the form of rings.

These sections are preferably made of refractory steel and comprise horizontal slots of which the upper edge is folded outwardly, and which serve as air vents.

The result of the invention is a new means for eliminating the residual combustible gases without having resort to tall surplus-gas flares.

Thanks to the arrangement of the superposed combustion chambers, supplied pregressively from bottom to top, the hot combustion gases form a central column, to the periphery of which come the combustion gases from each successive chamber. A considerable central depression is obtained, which varies with the outflow of residual gases, this automatically bringing about a supply of combustible air, by natural draft, substantially proportional to the outflow of residual gases.

The quality of combustion remains good under all conditions since the volumes of the combustion chambers in which the combustion by stages have taken place are proportional to the outflow of residual gases and since the temperature of the walls is therefore high near the place of combustion.

At each stage, the central flame coming from the lower chambers serves as a flare for igniting the fresh annular flame when a new burner is supplied due to an increase in the outflow of residual gases. There is therefore no risk of accidental extinction of the flare.

A flare according to the invention makes it possible to obtain increasingly higher speeds of the hot gases, of the order of about 25 to 35 metres per second at maximum outflow, without risk of the flames of each individual burner which are located at the periphery of the column of hot gases being blown out. Thanks to this speed, it is possible to construct flares of average height, of the order of 20 to 50 metres, since the combustion gases reach a height comparable with that of the conventional tall flares.

The invention will be more readily understood from the following description with reference to the accompanying drawings, in which:

FIGS. 1, 2 and 3 show vertical sections through flare stacks according to the invention.

These three figures show a cylindrical conduit 1 of revolution about an axis $x\ x'$, which is a conduit for evacuation of the hot gases resulting from the combustion of residual gases. This conduit is generally circular in cross-section but, of course, this is not compulsory, and the conduit is of average height, i. e. between 20 and 50 metres. It has air inlet vents 2 at its base.

The conduit 1 may be made of metal, reinforced concrete, brickwork or any other material. Its role is to serve as chimney stack for evacuating the burnt gases, creating a depression, a so-called natural draft, which brings about the outflow of gases and sucks in combustion-supporting air. At the same time, it supports the framework bearing the burners and the combustion chambers and protects them against the action of the wind.

FIG. 1 shows, in conduit 1, a frame 3 of any type, supporting a series of superposed cylinders 4 of axis $x\ x'$, whose diameter and height $h$ increase from bottom to top.

The top of each cylinder defines with the base of the cylinder superposed thereon an annular space 5 in which are disposed vents allowing passage of the combustion-supporting air circulating in the direction of the arrows.

At the base of each cylinder is disposed a perforated pipe 6 in the form of a ring, in which the residual gases arrive and which acts as gas burner.

In order to improve combustion, deflectors 7 are optionally disposed around these burners to create the deflection necessary for starting partial combustion.

Each cylinder 4 constitutes an annular combustion chamber comprising a gas burner 6 and an inlet for combustion-supporting air. The cylinders are made of a sufficiently refractory material to resist temperatures or made of metal covered with a refractory coating. The evacuation of the combustion gases is common to all the burners, the hot gases and the flames forming a central column.

The burners are fed separately and successively. The lower burner 6a is permanently supplied or re-ignited automatically. Then, the number of burners supplied increases, from bottom to top, or decreases automatically as a function of the outflow, all the burners being supplied when the outflow of residual gases is maximum.

To obtain this automatic variation of the number of burners suppled as a function of the outflow, any of the well-known regulating devices may be used. For example, the different burners are connected by means of hydraulic valves with progressive load or of motorised valves, to a common gas inlet manifold and the valves are opened successively, in the desired order, by a pressostat placed in the manifold, or directly by the variation of pressure of the residual gases.

These devices are well-known to the man skilled in the art and it is unnecessary to describe them in detail.

The device functions as follows. The central flame coming from the lower burners serves as ignition burner when a new burner is supplied. As the number of supplied burners increases, the volume of the hot gases increases, and the draft of the chimney stack increases.

The quantity of combustion-supporting air sucked in also increases. The outflow of combustion-supporting air is thus automatically varied substantially proportionally to the outflow of fuel and combustions take place in likewise proportional volumes, hence the quality of combustion remains good under all conditions.

The admission of fresh air being peripheral, it has the advantage of directly feeding the burners, whilst cooling the walls of the combustion chambers.

FIG. 2 shows a different embodiment in which the walls of the combustion chambers are made of refractory steel. This embodiment comprises a concial frustum 8 of axis $x\ x'$ made of refractory steel sheet, diverging upwardly. This truncated cone is divided into several successive sections 8a, 8b ..... 8g, the generatrices of which are in alignment.

Between the sections and at the base are disposed perforated pipes 9a, 9b .... 9g in the form of rings acting as gas burners, the perforations being directed towards the inside of the cone.

Air inlet vents 10 in the form of shutters are cut from the sheet, obtained by cutting out horizontal slots and by deforming at least one of the edges of said slots, preferably the upper edge 11 which is folded outwardly to channel the combustion-supporting air towards the openings.

The vents 10 may be continuous or discontinuous. As before, the burners 8a to 8g are successively supplied with residual gas starting from the bottom, as a function of the outflow of residual gas.

To render the drawing simpler, the frame supporting frustum 8 which may be of any type, has not been shown.

FIG. 3 shows a similar embodiment which also comprises an upwardly widened conical frustum 12, of axis $x\ x'$, made of refractory steel sheet, formed of several successive sections 12a, 12b .... 12f between which are disposed the burner rings 13a, 13b ... 13f. The relative position of these burners with respect to the successive sections of the conical frustum is different.

The successive sections present parallel generatrices, but the base of each section has a diameter greater than that of the top of the subjacent section, so that there is a gap between the two in which the burner is placed.

As in the preceding case, the sheets comprise air inlet vents in the form of shutters or in any equivalent form and the burners are fed successively from bottom to top as a function of the outflow of residual gas.

This Figure schematically shows as an example the manifold 14 which supplies residual gases to the various burners 13a, 13b ... 13f, through pipes 15a, 15b ... 15f. In each of these pipes is placed a motorised valve 16a, 16b .... 16f.

A flowmeter 17 is placed in the manifold 14 to measure the total outflow of the residual gases. The signal furnished by this flowmeter is transmitted by a conductor 18 to a box 19 containing the measuring apparatus. Conductors or pneumatic pipes 20a, 20b .... 20f leave from the box 19 to transmit to valves 16 the orders for opening or closure as a function of the outflow measured by the flowmeter 17.

As the outflow increases and reaches the determined thresholds, the orders for opening are sent automatically and successively to each of the valves 16 from the lower valve 16a towards the upper valve 16f. Inversely, when the outflow of residual gases in the manifold 14 decreases, the orders of closure are sent successively to the valves 16 from top to bottom.

When there is a permanent outflow of residual gases, the valve 16a always remains open, so that burner 13a serves as pilot light.

When the outflow of residual gases is intermittent, the burner 13a is provided with an automatic igniting device which is fed automatically as soon as the valve 16a begins to open.

What is claimed is:

1. A device for burning residual gases comprising a plurality of vertically superposed, open-ended, co-axial tubes, each vertically successive tube having an interior volume greater than the interior volume of the tube next below to form a plurality of vertically superposed chambers of successively greater volume, the uppermost tube opening upwardly and the upper end of each other tube opening into the lower end of the tube next above, each tube also having at least a portion of the lower end thereof spaced from the upper end of the tube next below to provide air passageways between each pair of tubes, a plurality of residual gas burners, at least one at the lower portion of each tube and extending around the axis thereof, means for supplying said residual gases to said burners including control means for selectively supplying said residual gases to each said burner, means for measuring the flow of said residual gases in said supplying means and operating means responsive to said measuring means and connected to said control means for increasing the number of said burners to which said residual gases are supplied with an increase in said flow of said residual gases.

2. A device as set forth in claim 1, wherein the control means for the lowermost one of said burners is continuously open to continuously supply said residual gases to said lowermost burner.

3. A device as set forth in claim 1, further comprising means for automatically igniting the residual gases supplied to the lowermost one of said burners when such gases are supplied thereto.

4. A device as set forth in claim 1, wherein said operating means successively operates the control means of successively higher burners with increases in said flow of said residual gases.

5. A device as set forth in claim 1, further comprising a vertically extending conduit extending around said tubes, said conduit having a vertical height greater than the vertical height of said superposed tubes and having an opening at the top thereof for evacuating burned gases, said superposed tubes being disposed at the lower interior portion of said conduit with a plurality thereof spaced from said conduit and said conduit having at least one opening at the bottom thereof for the supply of combustion air to said tubes.

6. A device as set forth in claim 5, wherein each tube is a hollow cylinder and each successively higher tube has a diameter and height greater than the diameter and height of the tube next below and wherein the bottom of each tube is at substantially the same level as the top of the tube next below to provide said air passageways between each pair of tubes.

7. A device as set forth in claim 5, wherein each of said tubes is in the shape of an upwardly widening conical frustum.

8. A device as set forth in claim 7, wherein the diameter of the lower end of each successive tube is substantially equal to the diameter of the upper end of the next lower tube and is joined with the latter with portions thereof spaced from the next lower tube to provide said air passageways and wherein said gas burners are ring shaped pipes having radially inwardly directed perforations for the passage of said residual gases therethrough.

9. A device as set forth in claim 8, wherein said tubes are made of a refractory material and wherein said lower end of each tube has said portions thereof bent outwardly from the axis of the tube.

10. A device as set forth in claim 7, wherein the diameter of the lower end of each successive tube is greater than the diameter of the upper end of the next lower tube to provide said air passageways between said tubes and said gas burners are ring shaped pipes having upwardly directed perforations therein for the passage of said residual gases therethrough and wherein each said burner is disposed in one of said air passageways.

11. A device as set forth in claim 5, further comprising means for injecting water vapor into at least one of said residual gases and said combustion air.

\* \* \* \* \*